United States Patent [19]
Marshall

[11] Patent Number: 5,406,799
[45] Date of Patent: Apr. 18, 1995

[54] COMBUSTION CHAMBER

[75] Inventor: Richard L. Marshall, Manchester, Conn.

[73] Assignee: United Technologies Corporation, Hartford, Conn.

[21] Appl. No.: 898,053

[22] Filed: Jun. 12, 1992

[51] Int. Cl.$^6$ ............................................. F23R 3/46
[52] U.S. Cl. ........................................ 60/747; 60/748
[58] Field of Search .................. 60/39.37, 733, 737, 60/746, 747, 748

[56] References Cited

U.S. PATENT DOCUMENTS

| Re. 33,896 | 4/1992 | Maghon et al. | 431/284 |
|---|---|---|---|
| 3,016,705 | 1/1962 | Kneidl et al. | 60/39.74 |
| 3,701,255 | 10/1972 | Markowski | 60/38.72 R |
| 3,747,345 | 7/1973 | Markowski | 60/261 |
| 3,788,065 | 1/1974 | Markowski | 60/39.02 |
| 3,792,582 | 2/1974 | Markowski | 60/39.72 R |
| 3,811,277 | 5/1974 | Markowski | 60/39.65 |
| 3,872,664 | 3/1975 | Lohmann et al. | 60/39.65 |
| 3,919,840 | 11/1975 | Markowski | 60/39.65 |
| 3,930,370 | 1/1976 | Markowski et al. | 60/261 |
| 3,937,008 | 2/1976 | Markowski et al. | 60/39.06 |
| 3,973,395 | 8/1976 | Markowski et al. | 60/39.65 |
| 3,974,646 | 8/1976 | Markowski et al. | 60/39.65 |
| 3,979,939 | 4/1977 | Markowski | 60/39.65 |
| 4,045,956 | 9/1977 | Markowski et al. | 60/39.65 |
| 4,058,977 | 11/1977 | Markowski et al. | 60/39.65 |
| 4,145,878 | 3/1979 | Markowski | 60/261 |
| 4,145,879 | 3/1979 | Markowski | 60/261 |
| 4,145,880 | 3/1979 | Markowski | 60/261 |
| 4,194,358 | 3/1980 | Stenger | 60/747 |
| 4,194,359 | 3/1980 | Brookman et al. | 60/39.36 |
| 4,246,758 | 1/1981 | Carvel et al. | 60/747 |
| 4,260,367 | 4/1981 | Markowski et al. | 431/353 |
| 4,265,615 | 5/1981 | Lohmann et al. | 431/353 |
| 4,365,577 | 12/1982 | Pearce | 60/737 |
| 4,389,848 | 6/1983 | Markowski et al. | 60/738 |
| 4,474,014 | 10/1984 | Markowski | 60/738 |
| 4,527,386 | 7/1985 | Markowski | 60/39.36 |
| 4,977,740 | 12/1990 | Madden et al. | 60/39.463 |
| 5,036,657 | 8/1991 | Seto et al. | 60/746 |
| 5,044,559 | 9/1991 | Russell et al. | 239/406 |
| 5,099,644 | 3/1992 | Sabla et al. | 60/267 |
| 5,197,278 | 3/1993 | Sabla et al. | 60/747 |
| 5,197,289 | 3/1993 | Glevicky et al. | 60/746 |
| 5,220,795 | 6/1993 | Dodds et al. | 60/747 |
| 5,285,635 | 2/1994 | Savelli et al. | 60/39.36 |

OTHER PUBLICATIONS

"Lean and Clean", Flight International, Aug. 12–18 1992, pp. 66–69.

Primary Examiner—Stephen C. Bentley
Attorney, Agent, or Firm—Gene D. Fleischhauer

[57] ABSTRACT

A combustion chamber 42 for an axial flow rotary machine 10 is disclosed. Various construction details are developed for controlling the production of emissions such as carbon monoxide, unburnt hydrocarbons and oxides of nitrogen. In one embodiment, the combustion chamber has a pilot zone 108 which extends axially and a main zone 106 axially adjacent to the pilot zone which has a divergent outer wall having a divergent end region 178 through which locally swirling gases are injected into swirling gases from the pilot zone 108.

20 Claims, 2 Drawing Sheets

COMBUSTION CHAMBER

TECHNICAL FIELD

This invention relates to a combustion chamber for burning fuel with an oxidizer fluid over a wide range of fuel flows and, more particularly, to a combustion chamber for a gas turbine engine which has a pilot zone and a main zone for burning the fuel with an acceptable level of unburnt hydrocarbons, carbon monoxide and oxides of nitrogen.

BACKGROUND OF THE INVENTION

An axial flow rotary machine, such as a gas turbine engine for an aircraft, includes a compression section, a combustion section and a turbine section. A flowpath for hot working medium gases extends axially through the engine. The flowpath for hot gases is generally annular in shape.

As the working medium gases are flowed along the flowpath, the gases are compressed in the compression section causing the temperature and pressure of the gases to rise. The hot, pressurized gases are burned with fuel in the combustion section to add energy to the gases. These gases are expanded through the turbine section to produce useful work and thrust.

The engine has a rotor assembly in the turbine section which is adapted by a rotor disk and blades extending outwardly therefrom to receive energy from the hot working medium gases. The rotor assembly extends to the compression section. The rotor assembly has compressor blades extending outwardly across the working medium flowpath. The high energy working medium gases in the turbine section drive the rotor assembly about its axis of rotation. The compressor blades rotate with the rotor assembly and drive the incoming working medium gases rearwardly, compressing the gases and imparting a swirl velocity to the gases.

The combustion section is located between the compression section and the turbine section. The combustion section includes a diffuser plenum and a combustion chamber disposed in the plenum. The diffuser plenum receives the hot, swirling gases from the compression section. The diffuser plenum reduces the velocity of the gases causing the static pressure to rise and distributes the working medium gases to the combustion chamber. The working medium gases entering a conventional aircraft gas turbine engine include air which, because of the presence of oxygen, provides an oxidizer fluid for the combustion chamber. Fuel is mixed with the oxidizer fluid in the combustion chamber and burned to add energy to the gases. The combustion process is not totally efficient causing the production of various emissions which are a function of engine power and the efficiency of the combustion process associated with that power.

At idle power, the combustion efficiency is slightly greater than 99% and is associated with the maximum production of hydrocarbons and carbon monoxide. At higher power, such as take-off, climb and cruise for an aircraft gas turbine engine, the combustion efficiency is greater than 99.9%, and the emissions are very low in hydrocarbons and carbon monoxide. However, the production of oxides of nitrogens and smoke particulates peaks at maximum power. In part, the oxides of nitrogen emissions are associated with operation of the combustion chamber at high temperatures which result from near stoichiometric fuel/air ratios (for efficiency) and the elevated temperature of the air from the compression section. Accordingly, low emission combustion chambers are designed to minimize at low power the production of hydrocarbons and carbon monoxide and to minimize at high power the production of oxides of nitrogen and smoke particulates. And, without having a fuel/air ratio so low at low power that the combustion chamber blows out and does not support combustion (lean blowout).

One example of a combustion chamber designed to reduce such emissions is shown in U.S. Pat. No. 4,045,956 issued to Markowski et al, entitled "Low Emission Combustion Chamber". The combustion chamber shown in Markowski is provided with means that cause hot gases from a pilot burner to swirl about the axis of the combustion chamber. Additional fuel is added to the hot gases and is vaporized as the gases swirl about the axis of the combustion chamber. Thereafter, combustion air is mixed with the fuel rich combustion products to complete the combustion process.

An earlier approach is shown in U.S. Pat. No. 3,872,664 entitled "Swirl Combustor With Vortex Burning And Mixing" issued to Lohmann and Markowski. In this construction, the combustion section includes a main combustion burner and a pilot burner. In one embodiment, the hot combustion products of the pilot burner are mixed with fuel prior to the hot combustion products leaving the pilot zone and entering the main zone of the burner. (The fuel rich combustion products leaving the pilot zone are described as having tangential motion which is essentially dissipated by the time the flow leaves the pilot zone and enters the main zone, col. 2, line 60.) Local columns of air swirling about the axis of swirl tubes 50 enter the main burner and are directed toward, engage and mix with the fuel rich combustion products. Alternatively, fuel may be added through the swirl tubes as shown in FIG. 4.

The above art notwithstanding, scientists and engineers are working under the direction of Applicant's Assignee to develop improved combustion chambers having low emissions.

SUMMARY OF THE INVENTION

This invention is in part predicated on the recognition of the importance of having locally swirling columns of gases in combustion products leaving a pilot zone and entering a main zone where the products are used to flash vaporize fuel.

According to the present invention, an annular combustion chamber extending circumferentially about an axis with a pilot zone and a main zone has: a pilot zone which is axially oriented and which has a plurality of injectors which are spaced circumferentially about the pilot zone for injecting into the pilot zone a plurality of local streams of fuel and air each swirling about the axis of its injector; and, a main zone extending radially outwardly of and axially adjacent to the pilot zone to receive locally swirling columns of gases from the pilot zone, the main zone having a second plurality of injectors which are spaced circumferentially about the main zone and radially outwardly of the main zone for injecting a plurality of local streams of gases into the main zone at an angle to the pilot zone, the gases including oxygen and fuel at a high power operative condition.

Another aspect of this invention is in part based on the recognition that air entering the combustion section of an axial flow rotary machine, such as a gas turbine engine, might carry with it water, which might occur during a heavy rainstorm under operative conditions, and of a magnitude which can adversely affect the ability of the pilot zone to maintain combustion at a low power operative condition, such as idle descent. It is also in part based on the recognition that fuel burned at high temperatures, such as when combusting fuel at stoichiometric ratios in the main zone, can create hot spots in the gas stream. These hot spots in the gas stream may impact the attachment region of the rotor blades to the rotor assembly. The resulting thermal gradients may impose severe thermal stresses on the rotor assembly in addition to the rotational stresses associated with supporting the rotor blades during operative movement of the rotor assembly.

In accordance with one embodiment of the invention, the discharge region of the compression section is radially aligned with the injectors for the pilot zone, the turbine inlet section is radially aligned with the main injectors and the main injectors are radially outwardly of the pilot injectors such that 1) hot gases associated with combustion in the main zone are moved outwardly away from the attachment region of the rotor blades to the rotor disk and 2) the swirling air entering the combustion section urges water vapor radially outwardly towards the main injectors and away from the pilot zone injectors which are disposed radially inwardly of the main injectors.

In accordance with one embodiment of the present invention, an annular combustion chamber extending circumferentially about an axis has an inner wall and an outer wall which extend in a generally axial direction to bound a pilot zone over a first portion of the chamber and a plurality of circumferentially spaced injectors, each for injecting a swirling stream of fuel and air about the axis of the injector into the pilot zone, the walls diverging from the axis of the combustion chamber over a second portion of the combustion chamber to bound a main zone axially adjacent to and extending radially outwardly of the pilot zone to bend the flowpath outwardly, the main zone having a second plurality of injectors which are circumferentially spaced, and each of which injects a swirling stream of gases into the main zone at an angle to the outwardly bent flowpath of the gases entering the pilot zone.

According to another aspect of the present invention, a method of operating the combustion chamber of an axial flow rotary machine having a pilot zone and a main zone includes forming hot gases in an axially extending pilot zone with circumferentially spaced swirling columns of gases which extend to the downstream end of the pilot zone and impacting these turbulent swirling gases with circumferentially swirling streams of gases in the main zone at low power and high power operative conditions, the swirling gases in the main zone containing only air at very low power operative conditions and air and fuel at high power operative conditions. In accordance with one detailed embodiment of this method, the method includes introducing radially a plurality of swirling, circumferentially spaced streams of gases into the exit of the pilot zone just prior to entering the main zone to further increase turbulence of the gases impacted by the swirling streams of gases in the main zone.

A primary feature of the present invention is a combustion chamber having a pilot zone which includes injectors for axially injecting swirling streams of air and fuel, the streams being circumferentially spaced about the pilot zone and extending well into the pilot zone. Another feature is a main zone which is radially outwardly of the pilot zone. The main zone has an outer wall that diverges. A plurality of injectors are circumferentially spaced about that portion of the main zone and directed inwardly toward turbulent gases leaving the primary zone. In one embodiment, at a very low power operative condition, the swirling streams of gases in the main zone are air and at a high power operative condition the swirling streams of gases are a mixture of air and fuel. In one embodiment, the pilot zone includes arrays of circumferentially spaced swirlers at the downstream end of the pilot zone. The circumferentially spaced swirlers produce columns of swirling gases which extend into the downstream end of the pilot zone and into the main zone. In one engine embodiment of the present invention, the engine has a pre-diffuser region at the exit to the compression section and a turbine inlet region axially spaced from the pre-diffuser region and radially outwardly of the pre-diffuser region. The first plurality of fuel injectors in the pilot zone are radially aligned with the pre-diffuser region. The second plurality of injectors and the discharge opening in the main zone are radially outwardly of the injectors in the primary zone and are radially aligned with the turbine inlet region. In one detailed embodiment, a third plurality of injectors are circumferentially interdigitated with one of the other plurality of injectors and supply fuel at a third operative condition of the engine.

A principal advantage of the present invention is the level of emissions which results from turbulently mixing circumferentially spaced swirling columns of gases in the main zone with very hot swirling columns of gases exiting the pilot zone under all operative conditions of the engine. Another principal advantage at high power operative conditions is the level of emissions which results from rapidly mixing, vaporizing and burning fuel injected into the main zone in turbulent streams with hot turbulent streams of gases from the pilot zone. At high power operative conditions an advantage in one embodiment is the level of oxides of nitrogen emissions which results from the location of the main zone immediately downstream of the pilot zone and the low residence time which results from reducing the combustion volume with an inner wall that extends radially outwardly toward the divergent portion of the outer wall. Another advantage is the tolerance of the combustion chamber to water ingestion without blowout in the pilot zone (and thus the main zone) by locating the pilot zone injectors inwardly of the main zone injectors and inwardly of the outermost portion of the pre-diffuser region. Another advantage is the level of stresses in the rotor disk which results from the outward radial location of the hottest gases exiting the main zone by radially aligning the outwardly located main zone injectors with the turbine inlet section of the engine. Still another advantage is the level of emissions that results from a large amount of air flowing into the main zone which results from facing the outer wall in the main zone in the upstream direction and mounting the main zone injectors therein to take advantage of the ram effect of the incoming air in the diffuser plenum.

The foregoing features and advantages of the present invention will become more apparent in light of the following detailed description of the best mode of carrying out the invention and in the accompanying drawings.

BRIEF DESCRIPTION OF THE DRAWINGS

FIG. 3 is an enlarged perspective view of a swirler for the combustion chamber.

FIG. 4 is a view taken along the lines of 4—4 of FIG. 1 with portions of the engine broken away for clarity.

BEST MODE FOR CARRYING OUT THE INVENTION

Figure 1:
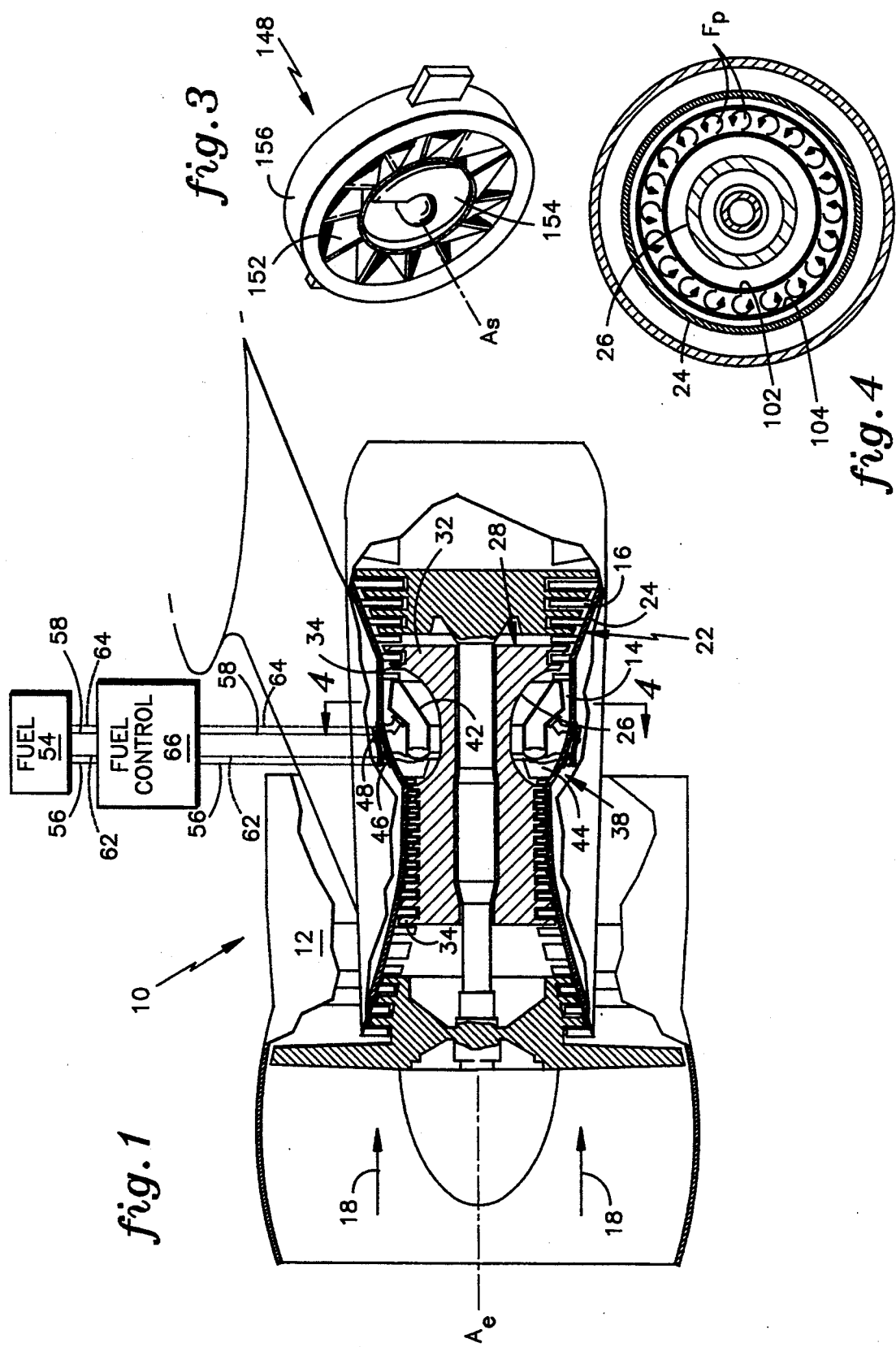
FIG. 1 is a simplified side elevation view of a gas turbine engine showing a flowpath for working medium gases with a portion of the engine case broken away to show an annular combustion chamber.

FIG. 1 is a side elevation view of a turbofan, gas turbine engine embodiment 10 of the present invention. This engine is one type of axial flow rotary machine used to power aircraft.

The gas turbine engine has an axis $A_e$. A compression section 12, a combustion section 14 and a turbine section 16 are disposed circumferentially about the axis $A_e$. An annular flowpath 18 for working medium gases extends circumferentially about the axis $A_e$ and rearwardly through the sections of the engine.

A stator assembly 22 extends axially through the sections of the engine to bound the annular flowpath 18 for working medium gases. The stator assembly includes an outer case 24 which extends circumferentially about the axis of the engine and an inner case 26 spaced radially inwardly from the outer case.

A rotor assembly 28 extends axially through the engine inwardly of the stator assembly 22. In the turbine section 16, the rotor assembly has at least one rotor disk 32 and an array of rotor blades 34 extending outwardly therefrom across the working medium flowpath. The rotor blades are attached to the rotor assembly at an attachment region 36. The turbine section also includes a turbine inlet region 38 which adapts the turbine section to receive the hot gases from the combustion section.

In the compression section 12, the rotor assembly 28 includes an array of rotor blades 34. The rotor blades extend outwardly across the working medium flowpath 18 for pressurizing the working medium gases. The pressurized working medium gases are in flow communication via the annular flowpath 18 with the combustion section 14.

The combustion section 14 includes a combustion chamber 42 and a diffuser 44 for working medium gases. The combustion chamber and diffuser extend circumferentially between the outer case 24 and the inner case 26. The combustion chamber includes a first plurality of injectors for fuel and a second plurality of injectors for fuel, as represented by first the fuel injector 46 and the second fuel injector 48. Each injector is disposed in an associated opening in the combustion chamber. The injectors are adapted to pass pressurized gases which contain an oxidizer fluid (which is air in the embodiment shown) from the diffuser 44 to the combustion chamber 42. An igniter 52 extends into the combustion chamber to ignite the mixture of fuel and air on the interior of the combustion chamber.

As shown in schematic fashion, the gas turbine engine 10 is provided with a source of liquid fuel 54. A first conduit means 56 is in flow communication with the first plurality of fuel injectors 46. A second conduit means 58 is in flow communication with the second plurality of fuel injectors 48. A third conduit means 62 is in flow communication with a third plurality of fuel injectors (not shown). A fourth conduit means 64 is in flow communication with a fourth plurality of fuel injectors (not shown). An electronic fuel control 66, such as the fuel control Model EEC 150-20 manufactured by the Hamilton Standard Division, United Technologies Corporation, Conn., controls the flow of liquid fuel through the conduits to each fuel injector.

Figure 2:
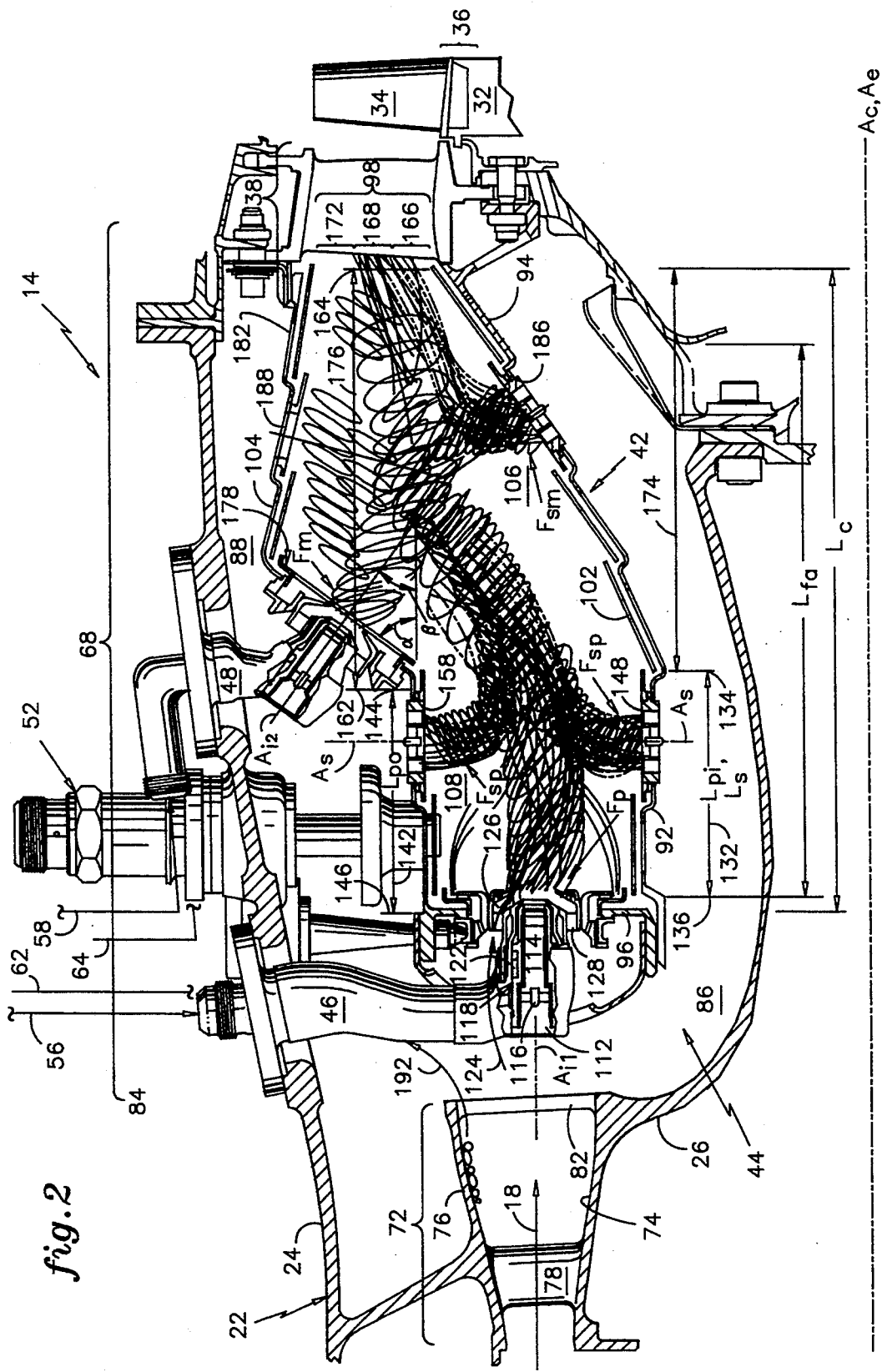
FIG. 2 is an enlarged view of a portion of FIG. 1 showing the annular combustion chamber and injectors, such as fuel nozzle assemblies, which extend through the walls of the combustion chamber.

FIG. 2 is an enlarged cross-sectional view of a portion of the engine in FIG. 1 showing the combustion section 14 and relationship of the combustion chamber 42 to the diffuser 44.

The diffuser 44 has a diffuser plenum 68 and a pre-diffuser region 72 which extend circumferentially about the engine. The pre-diffuser region includes an inner wall 74 and an outer wall 76 which extend circumferentially and a plurality of vanes 78 and struts 82 which extend radially. The pre-diffuser region is in flow communication with the compression section 12 and with the upstream end 84 of the diffuser plenum for discharging compressed working medium gases into the diffuser plenum. As can be seen, the pre-diffuser region is radially inwardly of the turbine inlet region 38.

The combustion chamber 42 is annular in shape and extends circumferentially about an axis $A_c$. The axis $A_c$ is coincident with the axis $A_e$ in the embodiment shown. The combustion chamber is spaced radially outwardly from the inner case 26 leaving an inner flowpath 86 for cooling gases therebetween and spaced radially inwardly from the outer case 24 leaving an outer flowpath 88 for cooling gases therebetween. The working medium flowpath 18 extends into the combustion chamber from the diffuser plenum.

The combustion chamber has an upstream end 92 and a downstream end 94. A radially oriented end wall 96 is at the upstream end of the combustion chamber. An opening 98 for discharging hot gases is at the downstream end of the combustion chamber. A circumferentially extending inner wall 102 and a circumferentially extending outer wall 104 extend between the ends, the outer wall being spaced radially from the inner wall leaving the flowpath 18 for working medium (combustion) gases therebetween. Each wall may be formed of a Floatwall TM liner of the type available from the Pratt & Whitney Group of United Technologies Corporation. The liner has panels with backside convection and slot film cooling to isolate the structural shells from the hot gases of the flowpath 18.

The combustion chamber has a main zone 106 adjacent the downstream end 94 and a pilot zone 108 adjacent the upstream end 92. The pilot zone has a stabilized length $L_s$. The stabilized length $L_s$ is the length of the combustion chamber pilot zone required for stability in burning at high altitude operations, such as thirty-thousand feet. Stability in burning at high altitude is a state of the combustion process that enables relight under normal operative conditions. Stability is effected by the operative parameters and volume of the combustion process, thus the pilot zone has a prescribed volume for stability.

The first plurality of injectors 46 are spaced circumferentially about the end wall 96. Each injector is disposed about an axis $A_{i1}$ which extends in a generally axial direction through the end wall. The injector has an inner air supply means 112 having a first passage 114 and a plurality of swirl means 116 for imparting rotational movement to the air passing through the first passage. The injector has a fuel supply means 118 having a second passage 122 for fuel in flow communication with the source of fuel 54. The second passage 122 extends circumferentially about the first passage 114.

The injector has an outer air supply means 124 which extends circumferentially about the second passage and has a third passage 126 and a plurality of swirl vanes 128 disposed therein for imparting swirling motion to the air passing through the swirl vanes. These swirl vanes in conjunction with the fuel passage 122 inject in an axially oriented direction a stream of fuel and air which is swirling about the axis of the injector. As a result, a plurality of circumferentially extending streams of gases (initially fuel and air) extend for a length $L_{fa}$ which extends into the main zone. Each injector is in flow communication with a source of fuel and a source of air (diffuser plenum) under a low power operative condition and a high power operative condition of the combustion chamber.

The pilot zone 108 has a first portion 132 of the inner wall. The first portion of the inner wall has a downstream end 134 and has an upstream end 136 which is attached to the end wall. The pilot zone has a first portion of the outer wall 142. The first portion 142 of the outer wall has a downstream end 144 and has an upstream end 146 which is attached to the end wall 96. The first portion of each wall extends in a generally axial direction from the end wall for a distance $L_{po}$ for the outer wall and $L_{pi}$ for the inner wall. The distances $L_{po}$ and $L_{pi}$ are equal to the stabilized length $L_s$ of the pilot zone.

The pilot zone 108 includes a first plurality of swirlers 148 at the downstream end 134 of the first portion 132 of the inner wall. The swirlers are spaced circumferentially about the inner wall. FIG. 3 is an enlarged view of a typical swirler. Each swirler 148 has an axis $A_s$ which extends in a generally radial direction and a plurality of swirl vanes 152 extending radially between an inner wall 154 and an outer wall 156. The swirler is adjacent to the pilot zone for injecting a stream of air into the pilot zone which has a first swirl direction.

The pilot zone has a second plurality of swirlers 158 at the downstream end of the first portion of the outer wall. These swirlers are identical to the swirlers shown in FIG. 3 except that the vanes are angled in the opposite direction such that the swirlers have a second swirl direction which is opposite to the first swirl direction. Accordingly, each of the second plurality of swirlers has an axis $A_s$ which extends in a generally radial direction and which is adjacent to the pilot zone for injecting a stream of air in a generally radial direction into the pilot zone. The swirlers are spaced circumferentially about the inner wall and may be staggered circumferentially with respect to the first plurality of swirlers or they may be radially aligned with the first plurality of swirlers. In other embodiments, the first and second swirlers may have swirl directions that are the same.

The main zone 106 is axially adjacent to the pilot zone 108 and is axially spaced by approximately one-half the length $L_c$ of the combustion chamber from the injectors. The main zone has an upstream end 162 and a downstream end 164. The main zone receives hot gases from the pilot zone and has the discharge opening 98 for discharging hot gases into the turbine section. The discharge opening has an inner portion 166, a middle portion 168 and an outer portion 172.

The main zone includes a second portion 174 of the inner wall which extends to the discharge opening from the pilot zone. The second portion of the inner wall diverges in the downstream direction from the axis of the combustion chamber to form a conical surface. The main zone includes a second portion of the outer wall 176. The second portion of the outer wall extends from the pilot zone and is radially outwardly of the first portion of the outer wall in the pilot zone. The second portion of the outer wall has an upstream end region 178 which is angled at an angle $\alpha$ to the outer wall of the pilot zone as measured in a radial plane which contains the axis of the combustion chamber. The angle lies in a range of from about thirty degrees (30°) to about sixty degrees (60°) but may extend to seventy-five degrees (75°). The second portion of the outer wall also includes a downstream end region 182. The downstream end region extends radially inwardly in a downstream direction toward the axis of the combustion chamber to form an inwardly convergent conical type surface terminating in the discharge opening 98 of the combustion chamber.

The main zone 106 includes a second plurality of injectors 48 which are spaced circumferentially about the upstream end region 178 of the second portion 176 of the outer wall. Each injector is disposed about an axis $A_{i2}$ which extends at an acute angle $\delta$ to the axial direction. Each injector has passages and swirl means of the type utilized in the first plurality of injectors. Accordingly, each injector injects in an axially oriented direction a stream of gases which is swirling about the axis of the injector. The axis of the injector at the outer wall is radially aligned with the middle portion 168 of the discharge region 98. The acute angle $\delta$ of the axis and of the swirling stream of gases to the axis of the chamber and to the pilot zone lies preferably in a range of thirty degrees (30°) to forty-five degrees (45°). Each injector is in flow communication with only a source of air under a low power operative condition and a source of fuel and a source of air under a high power operative condition of the combustion chamber. In other embodiments, there may be a low power operative condition at which fuel is supplied to the main zone of the combustion chamber.

In the embodiment shown, the combustion chamber has a third plurality of swirlers 186 which are identical to the swirlers 148 shown in FIG. 3 and which face the second plurality of injectors. The swirlers are spaced circumferentially about the inner wall. Each swirler has an axis $A_s$ which extends in a generally perpendicular direction to the inner wall for injecting a stream of air into the main zone 106 which swirls about said axis. Alternatively, the third set of swirlers may be disposed in the second portion 176 of the outer wall 104 or may be disposed in both walls 174, 176. In the embodiment shown, an opening in the outer wall provides additional combustion air to the main zone instead of having a swirler at that location.

In alternate embodiments, additional pluralities of injectors may be interdigitally disposed with the first plurality of injectors, the second plurality of injectors or with both pluralities of injectors. The additional pluralities of injectors, such as a third plurality and a fourth plurality of injectors, are controlled by the electronic engine control to only flow fuel during preselected operative conditions of the engine so that the pilot zone and the main zone each have two stages. The third conduit means 62 for fuel and the fourth conduit means 64 for fuel (as shown by the dotted lines) extend from the source of fuel to these injectors and are controlled by the electronic fuel control.

During operation of the gas turbine engine 10 shown in FIG. 1, working medium gases are flowed along the working medium flowpath 18. The gases leave the compression section 12 having an axial component of velocity and a tangential component of velocity causing the gases to swirl helically about the axis $A_e$ of the engine. The gases pass through the pre-diffuser region 72 to remove a portion of the swirl component from the gases as the gases enter the diffuser plenum 68.

By reason of the swirling nature of the gases, water 192 which is ingested during operative conditions of the engines, such as might occur during a thunderstorm, moves to the outer wall portion 76 of the flowpath 18 through the pre-diffuser region 72. The water is centrifuged outwardly along the outermost portion of the pre-diffuser region and into the outermost flowpath 88 for air through the diffuser plenum 68. Because the pilot zone is located inwardly toward the axis of the engine, most of the water enters the diffuser plenum outwardly of the first (pilot) injectors 46 and does not interfere with operation of the pilot injectors. This avoids a problem associated with pilot injectors aligned with or outwardly of the outermost portion of the pre-diffuser region; that is, the possibility of a blowout of the pilot zone with a concomitant loss of power should a significant amount of water be ingested into the engine inlet.

During at least one low power operative condition of the engine, fuel and air are injected at each of the first (pilot) injectors 46, and swirl about the axis of the injector. The igniter 52 extends radially into the combustion chamber 42 to ignite the fuel and the burning gases. The fuel and air are ignited, with the burning gases following a helical path down the length of the primary zone into the main zone as represented schematically by the path of one column of swirling gases $F_p$. Accordingly, as shown in FIG. 4 a plurality of columns $F_p$ of swirling gases extends axially down the length of the pilot zone. As the gases are flowed downstream in the pilot zone, the gases encounter swirling columns of air $F_{sp}$ entering from the first set of swirlers 148 and the second set of swirlers 158. These swirling columns of air are swept into the main zone still swirling about their axis.

During at least one low power operative condition of the engine, air enters through the second plurality 48 of injectors at an angle to the flowpath 18 for working medium gases. At the same location, the flow path 18 is forced radially outwardly by the diverging inner wall 174 into the swirling columns of air. The gases violently intermix. In addition, additional swirling gases from swirlers 186 enter to quickly lower the temperature of the burning gases (which can reach or exceed three thousand degrees Fahrenheit (3000°)) and cool the gases before the gases leave the discharge region 98 of the combustion chamber and enter the turbine section 16 through the turbine inlet region 38. As a result, any water at low power which enters the main zone has no effect on the combustion at low power operative conditions because combustion is complete in the pilot zone.

One of the advantages of the present invention is the amount of air flowable into the main zone 106 which results from facing the second plurality of injectors 48 in the upstream direction and the area of the divergent portion (upstream end region 178) of the outer wall. The area of the wall is increased by angling the wall with respect to the flowpath. This design takes advantage of the ram effect of the high velocity air flowing along the outer flowpath 88 in the diffuser plenum.

During high power operative conditions, fuel is added in the plurality of second injectors 48 along with the incoming air. In one embodiment, approximately eighty percent (80%) of the fuel burned enters through the second plurality of injectors and only twenty percent (20%) of the fuel burned enters through the first plurality of injectors. The fuel entering through the secondary injectors is rapidly intermixed with the very hot gases entering from the pilot zone 108. The high temperature of these pilot gases (like the flames from a plurality of blowtorches) coupled with the rapid turbulent mixing of the plurality of swirling streams of gases about a plurality of axes entering the main zone from the pilot zone and the combustion air and fuel entering the main zone from the second plurality 48 of injectors and from the downstream swirlers 186 causes rapid mixing, volatilization and combustion of the fuel. Thus, a significant advantage is the completeness and rapidity of complete combustion.

The rapidity of combustion permits complete combustion in a short flowpath for the main zone. Because this reduces the residence time of the hot gases at a high temperature, a significant advantage is the level of oxides of nitrogen emissions. In summary, the violent mixing permits locating the main injectors about half way between the upstream end and the downstream end of the combustion chamber, significantly cutting the distance the gases have to travel and decreasing the residence time in comparison to constructions where the plurality of second injectors is mounted adjacent the pilot zone at the upstream end of the combustion chamber. The residence time is further decreased with the divergent inner wall 274 which decreases the volume of the main zone. Because the production of oxides of nitrogen emissions is a function of time at temperature, decreasing the residence time in the combustion chamber results in reduced levels of oxides of nitrogen emissions in comparison to constructions which are longer or which have more volume in the main zone.

Another advantage at high power operative conditions results from the radial alignment of the main (second) injectors 48 with the discharge region 98 and turbine inlet region 38 of the turbine section 16. As can be seen, the axis of the plurality of second injectors at the outer wall is radially aligned with and has a line-of-sight flowpath to the mid-portion of the turbine inlet section. As a result, the radial temperature profile peak in the main zone flow radially outwardly toward the outer radius of the turbine inlet section along a line-of-sight flowpath. The hottest gases impact the downstream rotor assembly 28 at the outer portion of the rotor blades. This avoids severe thermal gradients and associated thermal stresses at the critical interface 36 between the rotor blades 34 and the rotor disk 32 which already has high stresses resulting from the rotational loads of the rotor blades on the disk. In addition, the swirlers 186 in the inner wall introduce air, a portion of which tends to move in swirling fashion along the inner wall to further provide a barrier of relatively cooler air (although the gases in an absolute sense are quite hot) to the disk blade interface.

Any water which is swept into the main zone is diluted by the massive amounts of ram air coming in through the angled outwardly divergent portion of the outer wall. Should the water have an adverse effect on operation of the main zone, causing the main zone combustion to be extinguished, relight occurs immediately because of the presence hot burning gases entering from the pilot zone.

The angle $\delta_i$ of the entering gases and fuel through the plurality of second injectors is at approximately thirty degrees (30°) to forty-five degrees (45°) with respect to the axial direction. Examination of flow phenomena suggest that shallower angles have less of an effect on mixing, but still have some favorable effect.

The inner wall 174, which diverges radially from the axis of the combustion chamber, urges the hot working medium gases from the pilot zone out toward the outer wall. This increases the angle of the gases and fuel entering through the secondary injectors to the flowpath of the gases in comparison to construction where the gases proceed axially and which have the same ram effect of plenum gases and surface area in the divergent portion of the outer wall. This provides for more effective intermixing especially in comparison to constructions in which the working medium gases flow axially and main injectors are perpendicular to the wall of the combustion chamber. Such constructions do not present an opening which uses as effectively the ram effect of the plenum air.

At low power conditions, the injectors may be liquid cooled to avoid coking of the fuel in the injector during non-operative conditions of the secondary injector. Alternatively, air or nitrogen may be introduced to purge the main fuel injectors of fuel. The purge may be from an external pressure source or the ejector might be provided with a self-purging feature as shown in U.S. Pat. No. 3,016,705 issued to Kneidl et al entitled "Self-Purging Starting Fuel Nozzles For Gas Turbine Engines". Kneidl takes advantages of pressures existing in adjacent air passages through which the fuel nozzle extends into the combustion section to provide the pressure necessary to purge the starting nozzles. These passages are used in conjunction with a check valve to provide a self-purging feature.

Although the invention has been shown and described with respect to detailed embodiments thereof, it should be understood by those skilled in the art that various changes in form and detail thereof may be made without departing from the spirit and scope of the claimed invention.

I claim:

1. A combustion chamber having an axis, an axial direction which extends in the direction of the axis of the combustion chamber, an outer wall and an inner wall which extend circumferentially about the axis of the chamber to bound the flowpath for combustion gases, which comprises:

a pilot zone for burning fuel and an oxidizer fluid to form hot products of combustion which has an upstream end and a downstream end, the outer wall being spaced radially from the inner wall leaving the annular flowpath for combustion gases therebetween, the flowpath extending in a generally axial direction between the walls from the upstream end of the pilot zone to the downstream end of the pilot zone, a first plurality of injectors spaced circumferentially about the pilot zone and facing in the downstream direction, each injector having an axis $A_{i1}$ and means for injecting a stream of fuel and oxidizer fluid in an axially oriented direction which is swirling about the axis of the injector, each injector being in flow communication with a source of fuel and a source of oxidizer fluid under a low power operative condition and a high power operative condition of the combustion chamber;

a main zone adjacent the pilot zone which has an upstream end and a downstream end and which is in flow communication with the pilot zone to receive the products of combustion gases from the pilot zone, the gases including a plurality of swirling streams of gases which are associated with swirling streams of gases injected into the pilot zone, the main zone including a second plurality of injectors adjacent to the pilot zone, which are radially outwardly of the pilot zone and spaced circumferentially about the outer wall in the main zone, each injector being disposed about an axis which extends at an acute angle to the axial direction, each injector having a passage for fuel and at least one passage for oxidizer fluid, the passage having swirl means disposed circumferentially about the axis of the injector for injecting a stream of gases radially inwardly into the main zone which is swirling about the axis of the injector at an acute angle to the outer wall in the pilot zone, each injector being in flow communication with a source of oxidizer fluid under a low power operative condition of the combustion chamber, and a source of fuel and a source of oxidizer fluid under a high power operative condition of the combustion chamber, wherein the hot pilot gases entering the main zone from the pilot zone have swirling streams of gases as the gases enter the main zone which are turbulently intermixed with the swirling streams of gases directed inwardly into the upstream end of the main zone from the second plurality of injectors.

2. The combustion chamber of claim 1 wherein the inner wall has a length $L_{pi}$ in the pilot zone and the outer wall has a length $L_{po}$ in the pilot zone and wherein a plurality of the swirling streams of gases injected into the pilot zone through the injectors have a length $L_s$ which is greater than the lengths $L_{po}$ and $L_{pi}$.

3. The combustion chamber of claim 1 wherein the inner wall and the outer wall in the pilot zone have an upstream end and a downstream end and wherein the downstream end of at least one of said walls has a plurality of swirlers, each swirler being spaced circumferentially from the adjacent swirler about the wall, each swirler having an axis which extends in a generally radial direction and being located adjacent the primary zone for injecting a stream of oxidizer fluid into the primary zone.

4. The combustion chamber of claim 1 wherein the inner wall and the outer wall in the pilot zone have an upstream end and a downstream end and wherein the combustion chamber includes a first plurality of swirlers at the downstream end of the inner wall, the swirlers being spaced circumferentially about the inner wall, each swirler having an axis which extends in a generally radial direction adjacent the primary zone for injecting a stream of oxidizer fluid into the primary zone which has a first swirl direction, a second plurality of swirlers at the downstream end of the outer wall, the swirlers being spaced circumferentially about the outer wall and axially aligned with the first plurality of swirlers, each swirler having an axis which extends in a generally radial direction adjacent the primary zone for injecting a stream, of oxidizer fluid in a generally radial direction into the primary zone with a second swirl direction, opposite to the first swirl direction.

5. The combustion chamber of claim 1 wherein the injectors of the pilot zone and the injectors of the main zone are circumferentially offset one from the other such that radial planes passing through the center of each injector are spaced circumferentially.

6. The combustion chamber of claim 1 wherein a third plurality of injectors is disposed between one of said pluralities of injectors, and wherein the combustion chamber has a third operative condition at which fuel is flowed to the first, second and third pluralities of injectors and has a fourth operative condition at which fuel is flowed to the first and second pluralities of injectors.

7. The combustion chamber of claim 1 wherein one of said walls in the main zone has a third plurality of swirlers facing the second plurality of injectors, the swirlers being spaced circumferentially about said wall, each swirler having an axis which extends in a generally perpendicular direction to the outer wall for injecting a stream of oxidizer fluid into the main zone which swirls about such axis.

8. The combustion chamber of claim 2 wherein one of said walls in the main zone has a third plurality of swirlers facing the second plurality of injectors, the swirlers being spaced circumferentially about said wall, each swirler having an axis which extends in a generally perpendicular direction to the outer wall for injecting a stream of oxidizer fluid into the main zone which swirls about such axis.

9. The combustion chamber of claim 3 wherein one of said walls in the main zone has a third plurality of swirlers facing the second plurality of injectors, the swirlers being spaced circumferentially about said wall, each swirler having an axis which extends in a generally perpendicular direction to the outer wall for injecting a stream of oxidizer fluid into the main zone which swirls about such axis.

10. The combustion chamber of claim 4 wherein one of said walls in the main zone has a third plurality of swirlers facing the second plurality of injectors, the swirlers being spaced circumferentially about said wall, each swirler having an axis which extends in a generally perpendicular direction to the outer wall for injecting a stream of oxidizer fluid into the main zone which swirls about such axis.

11. The combustion chamber of claim 1 wherein the inner wall diverges in the downstream direction from the axis of the combustion chamber to urge the combustion gases discharged from the pilot zone radially outwardly toward the swirling streams of gases entering through the second plurality of injectors in the outer wall.

12. The combustion chamber of claim 2 wherein the inner wall diverges in the downstream direction from the axis of the combustion chamber to urge the combustion gases discharged from the pilot zone radially outwardly toward the swirling streams of gases entering through the second plurality of injectors in the outer wall.

13. The combustion chamber of claim 3 wherein the inner wall diverges in the downstream direction from the axis of the combustion chamber to urge the combustion gases discharged from the pilot zone radially outwardly toward the swirling streams of gases entering through the second plurality of injectors in the outer wall.

14. The combustion chamber of claim 4 wherein the inner wall diverges in the downstream direction from the axis of the combustion chamber to urge the combustion gases discharged from the pilot zone radially outwardly toward the swirling streams of gases entering through the second plurality of injectors in the outer wall.

15. An annular combustion chamber which extends circumferentially about an axis, the combustion chamber having an axial direction which extends in the direction of the axis of the combustion chamber, an upstream end and a downstream end, a radially oriented end wall at the upstream end of the combustion chamber and an opening for discharging hot gases at the downstream end, the combustion chamber having a circumferentially extending inner wall and a circumferentially extending outer wall which extend between the ends, the outer wall being spaced radially from the inner wall leaving a flowpath for combustion gases therebetween, which comprises:

a pilot zone having a stabilized length $L_s$, the pilot zone including a first plurality of injectors which are spaced circumferentially about the end wall, each injector being disposed about an axis which extends in a generally axial direction through the end wall, each injector having a passage for fuel and at least one passage for oxidizer fluid having swirl means disposed circumferentially about the axis of the injector for injecting in an axially oriented direction a stream of fuel and oxidizer fluid which is swirling about the axis of the injector, each injector being in flow communication with a source of fuel and a source of oxidizer fluid under a low power operative condition and a high power operative condition of the combustion chamber, a first portion of the inner wall and a first portion of the outer wall and a first portion of the outer wall each having a downstream end and an upstream end which is attached to the end wall, the first portion of each wall extending in a generally axial direction from the end wall for a distance $L_{po}$ for the outer wall and $L_{pi}$ for the inner wall which is equal to the stabilized length $L_s$ of the pilot zone;

a first plurality of swirlers at the downstream end of the first portion of the inner wall, the swirlers being spaced circumferentially about the inner wall, each swirler having an axis which extends in a generally radial direction, the swirler being adjacent to the pilot zone for injecting a stream of oxidizer fluid into the primary zone which has a first swirl direction, a second plurality of swirlers at the downstream end of the first portion of the outer wall, the swirlers being spaced circumferentially about the inner wall and axially aligned with the first plurality of swirlers, each swirler having an axis which extends in a generally radial direction, adjacent the pilot zone for injecting a stream of oxidizer fluid in a generally radial direction into the pilot zone which has a second swirl direction, opposite to the first swirl direction, a main zone adjacent to the pilot zone which receives hot gases from the pilot zone and has a discharge opening, the discharge opening having an inner portion, a middle portion and an outer portion, the main zone further including a second portion of the inner wall which extends to the discharge opening from the pilot zone and which diverges in the downstream direction from the axis of the combustion chamber to form a conical surface, a second portion of the outer wall which extends from the pilot zone and is radially outwardly of the first portion of the outer wall in the pilot zone, the second portion of the outer wall having an upstream end region, the upstream end region being angled outwardly at an angle to the outer wall of the pilot zone, the upstream end region facing in the upstream direction, and a downstream end region, the downstream end region extending radially inwardly in the downstream direction toward the axis of the combustion chamber to form an inwardly convergent conical-type surface, a second plurality of injectors which are spaced circumferentially about the upstream end region of the second portion of the outer wall, each injector being disposed about an axis which extends at an acute angle to the axial direction, each injector having a passage for fuel and at least one passage for oxidizer fluid having swirl means disposed circumferentially about the axis of the injector for injecting at an acute angle to the axially oriented direction, a stream of gases which is swirling about the axis of the injector, the acute angle lying in a range of thirty degrees (30°) to forty-five degrees (45°), each injector being in flow communication with a source of oxidizer fluid under a low power operative condition and a source of fuel and a source of oxidizer fluid under a high power operative condition of the combustion chamber, the axis of the injector at the outer wall being radially aligned with the middle portion of the discharge region.

16. The combustion chamber of claim 15 wherein the inner wall in the main zone has a third plurality of swirlers facing the second plurality of injectors, the swirlers being spaced circumferentially about the inner wall, each swirler having an axis which extends in a generally perpendicular direction to the inner wall for injecting a stream of oxidizer fluid into the main zone which swirls about said axis.

17. An annular combustion chamber having an axis for a gas turbine engine, which comprises:

a pilot zone which extends circumferentially about the axis of the combustion chamber, the pilot zone extending in a generally axial direction, and having a first plurality of injectors each having swirl means disposed about an axis and spaced circumferentially about the pilot zone and facing in the downstream direction;

a main zone adjacent the pilot zone which is in flow communication with the pilot zone, the main zone having an annular discharge opening which is radially outwardly of the pilot zone, an outer wall having a divergent portion outwardly of the pilot zone which is radially aligned with the discharge opening, and a plurality of secondary injectors disposed outwardly of the first plurality of injectors and in the divergent portion of the outer wall each having swirl means disposed about an axis and facing inwardly at an acute angle to the downstream direction of the pilot zone, the injectors being spaced axially in the downstream direction from the first plurality of injectors, being radially outwardly of the first plurality of injectors and being radially aligned with the annular discharge region of the combustion chamber.

18. The annular combustion chamber of claim 17 wherein the annular combustion chamber has an inner wall which extends radially outwardly in a divergent fashion in the downstream direction, from the pilot zone to the discharge opening.

19. A stator assembly for a gas turbine engine, the engine having an axis and an annular flowpath for working medium gases which extends axially through the engine and is bounded by the stator assembly, the engine including a compression section, a combustion section and a turbine section, the turbine section including a rotor assembly which extends from the compression section to the turbine section, the turbine section having at least one rotor disk and an array of rotor blades extending outwardly therefrom across the working medium flowpath which are attached to the rotor assembly at an attachment region, which comprises:

an outer case which extends circumferentially about the axis of the engine and an inner case spaced radially inwardly from the outer case leaving an annular diffuser plenum for working medium gases extending circumferentially therebetween which has an upstream end and a downstream end;

a pre-diffuser region extending circumferentially about the engine which is in flow communication with the compression section and the upstream end of the diffuser plenum for discharging compressed working medium gases into the diffuser plenum, the gases having a tangential component of velocity causing the gases to swirl about the axis of the engine;

a turbine inlet region extending circumferentially about the engine adjacent the downstream end of the diffuser plenum, the turbine inlet region being disposed radially outwardly of the pre-diffuser region;

a combustion section having a radial, axial staged annular combustion chamber disposed in the plenum extending circumferentially about an axis, the combustion chamber being spaced radially outwardly from the inner case leaving an inner flowpath for cooling gases therebetween and spaced radially inwardly from the outer case leaving an outer flowpath for cooling gases therebetween, the working medium flowpath extending into the combustion chamber from the diffuser plenum, the combustion chamber including a pilot zone which is axially oriented and which has a first plurality of injectors which are spaced circumferentially about the pilot zone and which are radially aligned with the pre-diffuser region, each injector having an axis and means for axially injecting into the pilot zone a stream of fuel and oxidizer fluid swirling about the axis of the injector;

a main zone axially adjacent to and extending radially outwardly of the pilot zone and, a second plurality of injectors which are spaced circumferentially about the main zone and which are spaced axially downstream of and radially outwardly of the first plurality of injectors and radially aligned with the turbine inlet section, each injector having an axis and means for injecting a stream of gases into the main zone at an angle to the pilot zone and angled inwardly toward the downstream direction, the gases including an oxidizer fluid but not fuel at a low power operative condition and including an oxidizer fluid and fuel at a high power operative condition;

wherein the swirling working medium gases from the compression section urge ingested water radially outwardly away from the pilot injectors toward the main injectors which increases the tolerance of the pilot zone to water ingestion at low power operative condition, and wherein the radial outward location of the second plurality of injectors in the main zone shifts the location of the peak temperature of the working medium gases radially outwardly so that the hottest gases are adjacent the more radially outward portion of the rotor assembly to shift thermal stresses associated with the gases away from the attachment region of the blades to the disk where rotational stresses associated with supporting the rotor blades occur.

20. The stator assembly of claim 19 wherein the combustion chamber has an outer wall which diverges radially outwardly in the main zone to accept the second plurality of injectors and wherein the inner wall diverges radially outwardly in the main zone to urge the pilot zone combustion gases outwardly into the swirling streams of gases from the secondary injectors and to decrease the volume of the main zone to decrease the residence time of the working medium gases in the main zone.

* * * * *